Oct. 5, 1937.  F. POPPENSIEKER  2,094,816
AUTOMATIC SINGLE SPINDLE TURRET LATHE
Filed May 29, 1936
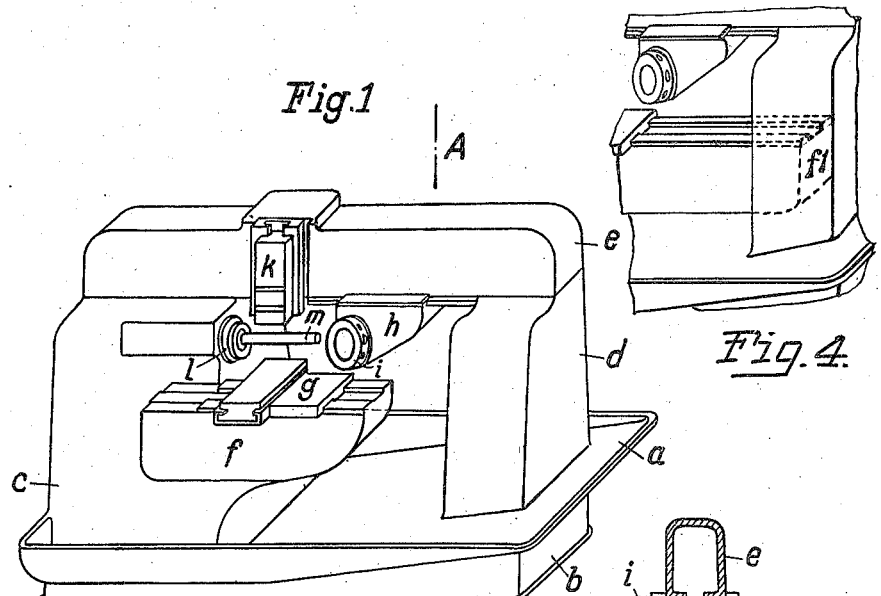
Fig.1
Fig.4
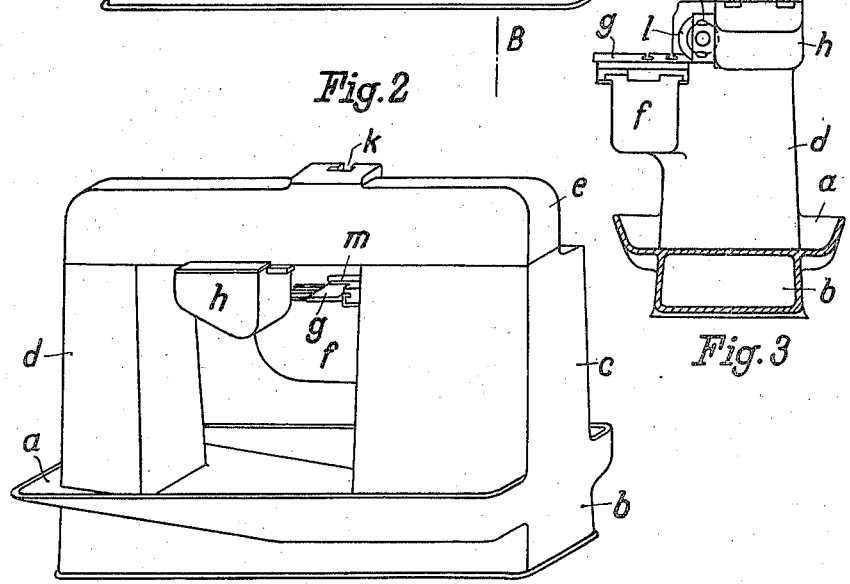
Fig.2
Fig.3
Inventor:
Fritz Poppensieker
by Karl ... 
atty.

Patented Oct. 5, 1937

2,094,816

UNITED STATES PATENT OFFICE 2,094,816

AUTOMATIC SINGLE SPINDLE TURRET LATHE

Fritz Poppensieker, Cologne, Germany

Application May 29, 1936, Serial No. 82,565
In Germany April 16, 1936

8 Claims. (Cl. 29—39)

My invention relates to lathes and more especially to an automatic single spindle turret lathe which is distinguished by an arrangement of parts favouring the disposal of the cuttings. In such turret lathes the blanks must frequently be machined in several different ways simultaneously, which necessitates a plurality of tools and slides. Hitherto the longitudinal slides formed a hindrance to the discharge of the cuttings particularly when a number of longitudinal slides were provided.

To avoid this drawback according to this invention an open frame is provided with a tool slide suspended from and guided on the upper cross beam of the frame. Beneath this upper longitudinal slide and laterally thereof a second longitudinal slide is supported on the frame in a position such that the cuttings formed by the action of the tools of the upper slide cannot collect on it. Preferably the lower longitudinal slide is carried on a bracket-like support which projects from the bed of the machine. This arrangement facilitates the machining of the guide surfaces for the lower longitudinal slide.

Two embodiments of a turret lathe according to the invention are shown by way of example in the accompanying drawing, in which Fig. 1 is a perspective front elevation of the lathe, Fig. 2 being a corresponding rear view, while Fig. 3 is a section along the line A—B of Fig. 1.

Fig. 4 illustrates a modification.

The two standards $c$ and $d$ are erected at the right and left of the base plate $b$ which is formed with a collecting trough $a$ for the turnings. On these two standards rests the cross beam $e$, on which is formed a guideway for the tool slide $h$, the tools in which operate on the blank $m$ which is rotated by the spindle $l$. Beneath this upper slide, but in a plane in front of the standard is arranged a second longitudinal slide $g$ which is guided on a support $f$ forming a bracket projecting from the machine bed. The clearing between this support $f$ and the right hand standard $d$ makes it possible for the cuttings to be removed from the front side of the machine. The support $f$ which extends in front of the lathe in the form of a bracket might also extend to the right hand of a bracket might also extend to the right hand of a standard $d$ and thus unite the two standards $c$ and $d$ as shown at $fl$ in Fig. 4. By arranging the two longitudinal slides $h$ and $g$ beneath one another and in different longitudinal planes the turnings cut by the tools of the upper slide are prevented from dropping onto the lower slide. In the embodiment shown, the upper slide $h$ carries the tools in a turret head $i$, which rotates in a vertical plane. This arrangement affords the advantage that the tools in this turret head never extend over the lower slide $g$ so that for this reason also turnings are prevented from dropping onto the lower slide.

Apart from the two longitudinal slides a transverse slide $k$ may be arranged on the upper beam $e$ in known manner. The spindle $l$ with the blank $m$ to be machined is preferably mounted in the left-hand standard $c$.

Thus, according to the invention the two longitudinal slides are spaced as far from one another as possible, i. e., they are disposed diagonally opposite one another with respect to the blank. Simultaneously with this separation of the points at which the tools engage the blank, a tool arrangement which does not mutually interfere is obtained. The upper longitudinal slide cannot possibly be impeded by the cuttings and the longitudinal slide which is disposed beneath it and on one side thereof is not affected either and in any case can readily be cleared of fragments which collect because there is no obstacle near or behind this slide. The working of the guide surfaces for the lower longitudinal slide is materially facilitated by the bracket-like arrangement of the guide member $f$. At the same time this bracket-like portion can serve to receive the means for driving the longitudinal slide.

I claim:

1. In an automatic single spindle turret lathe, an open frame comprising the bed of the machine, two standards erected on said bed in vertical position and an upper cross beam connecting said standards, a longitudinal guideway formed on said upper beam, a tool slide suspended from and guided by said guideway, a second longitudinal guideway formed on the frame of the machine at a lower level than and sideways of the upper guideway and a second tool slide supported and guided by said second guideway.

2. In an automatic single spindle turret lathe, an open frame comprising the bed of the machine, two standards erected on said bed in vertical position and an upper cross beam connecting said standards, a longitudinal guideway formed on said upper beam, a tool slide suspended from and guided by said guideway, a bracket-like support projecting from the bed of the machine, a second longitudinal guideway formed on said bracket at a lower level than and sideways of the upper guideway and a second tool slide supported and guided by said second guideway.

3. In an automatic single spindle turret lathe, an open frame comprising the bed of the machine, two standards erected on said bed in vertical position and an upper cross beam connecting said standards, a longitudinal guideway formed on said upper beam, a tool slide suspended from and guided by said guideway, a bracket-like support extending from one standard over part of the length of the machine frame only and spaced from the other standards, a second longitudinal guideway formed on said bracket at a lower level than and sideways of the upper guideway and a second tool slide supported and guided by said second guideway.

4. In an automatic single spindle turret lathe, an open frame comprising the bed of the machine, two standards erected on said bed in vertical position and an upper cross beam connecting said standards, a longitudinal guideway formed on said upper beam, a tool slide suspended from and guided by said guideway, a bracket-like support extending over the entire length of the frame of the machine, a second longitudinal guideway formed on said bracket at a lower level than and sideways of the upper guideway and a second tool slide supported and guided by said second guideway.

5. In an automatic single spindle turret lathe, an open frame comprising the bed of the machine, two standards erected on said bed in vertical position and an upper cross beam connecting said standards, a longitudinal guideway formed on said upper beam, a tool slide suspended from and guided by said guideway, a turret head mounted on said tool slide and indexing in a vertical plane, a second longitudinal guideway formed on the frame of the machine at a lower level than and sideways of the upper guideway and a second tool slide supported and guided by said second guideway.

6. In an automatic single spindle turret lathe, an open frame comprising the bed of the machine, two standards erected on said bed in vertical position and an upper cross beam connecting said standards, a longitudinal guideway formed on said upper beam, a tool slide suspended from and guided by said guideway, a turret head mounted on said tool slide and indexing in a vertical plane, a bracket-like support, a second longitudinal guideway formed on said bracket at a lower level than and sideways of the upper guideway and a second tool slide supported and guided by said second guideway.

7. In an automatic single spindle turret lathe, an open frame comprising the bed of the machine, two standards erected on said bed in vertical position and an upper cross beam connecting said standards, a longitudinal guideway formed on said upper beam, a tool slide suspended from and guided by said guideway, a turret head mounted on said tool slide and indexing in a vertical plane, a bracket-like support extending from one standard over a part of the length of the machine frame only and spaced from the other standard, a second longitudinal guideway formed on said bracket at a lower level than and sideways of the upper guideway and a second tool slide supported and guided by said second guideway.

8. In an automatic single spindle turret lathe, an open frame comprising the bed of the machine, two standards erected on said bed in vertical position and an upper cross beam connecting said standards, a longitudinal guideway formed on said upper beam, a tool slide suspended from and guided by said guideway, a turret head mounted on said tool slide and indexing in a vertical plane, a bracket-like support extending over the entire length of the frame of the machine, a second longitudinal guideway formed on said bracket at a lower level than and sideways of the upper guideway and a second tool slide supported and guided by said second guideway.

FRITZ POPPENSIEKER.